July 11, 1933.  C. L. COLBERT  1,917,924
CERAMIC WARE TREATING METHOD AND APPARATUS
Filed May 24, 1930  3 Sheets-Sheet 1
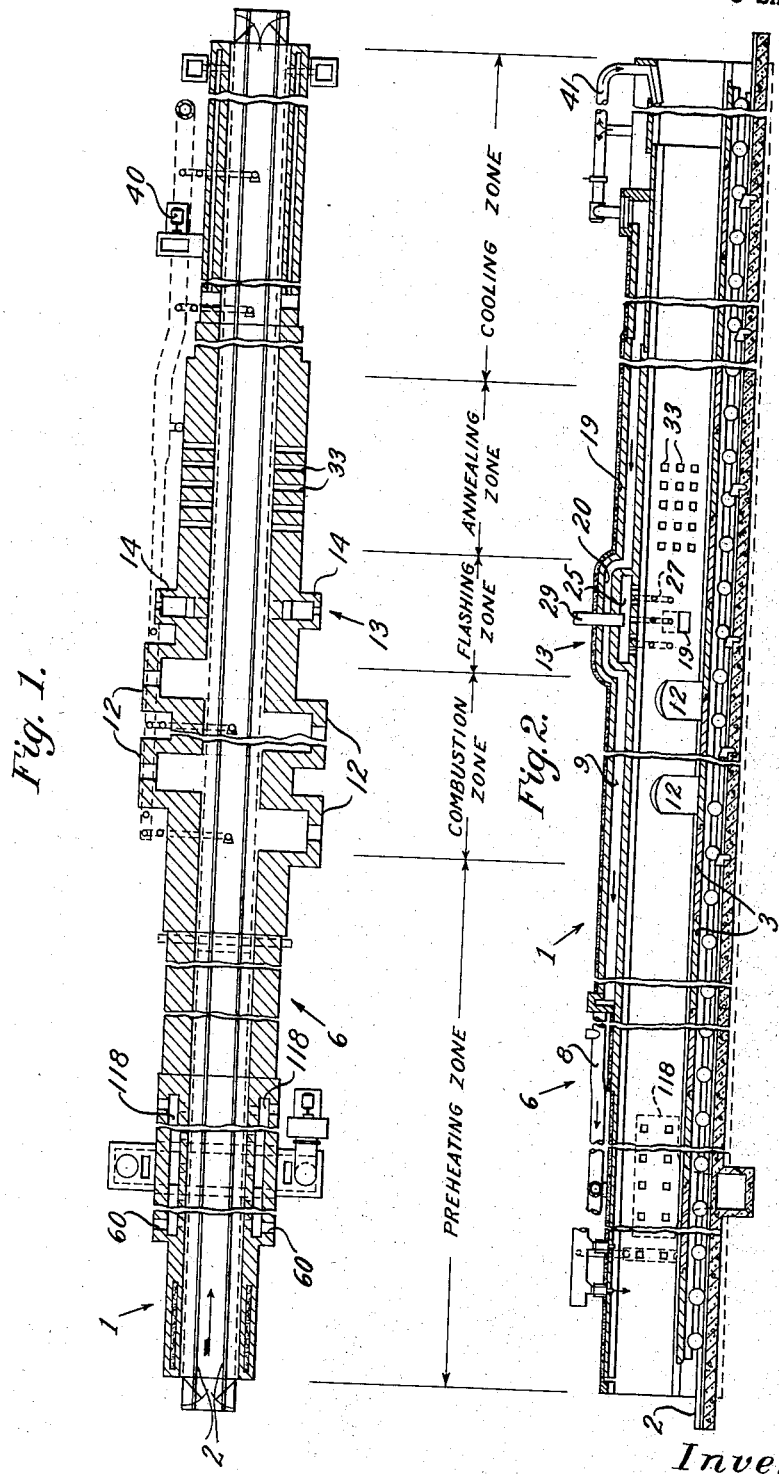
Inventor.
Clarence L. Colbert.
by Roberts, Cushman & Woodberry
Attys.

July 11, 1933.  C. L. COLBERT  1,917,924
CERAMIC WARE TREATING METHOD AND APPARATUS
Filed May 24, 1930  3 Sheets-Sheet 2

Inventor:
Clarence L. Colbert.
by Roberts, Cushman & Woodberry
Att'ys.

July 11, 1933.  C. L. COLBERT  1,917,924
CERAMIC WARE TREATING METHOD AND APPARATUS
Filed May 24, 1930   3 Sheets-Sheet 3

Inventor.
Clarence L. Colbert.
by Roberts, Cushman & Woodberry
Att'ys.

Patented July 11, 1933

1,917,924

UNITED STATES PATENT OFFICE

CLARENCE L. COLBERT, OF ELIZABETH, NEW JERSEY, ASSIGNOR TO FISKE & COMPANY, INC., OF BOSTON, MASSACHUSETTS, A CORPORATION OF MASSACHUSETTS

CERAMIC WARE TREATING METHOD AND APPARATUS

Application filed May 24, 1930. Serial No. 455,291.

This invention relates to improved apparatus and a corresponding method for treating ceramic articles, such as bricks, and more particularly for applying a surface treatment thereto such as "flashing". Heretofore bricks, tiles and the like have been treated with carbon, salts, manganese oxide, zinc and the like, in order to permit the natural color of the material to be varied. Thus treatment with dense smoke generated from coal, with or without manganese oxides, is employed to blacken the ware, while various other materials may be employed to impart various tints to the ceramic ware. Heretofore such a surface treatment has been effected in periodic kilns or the like, necessitating a limitation of output and requiring frequent individual attention to successive batches of articles, as well as involving the likelihood of non-uniform treatment of the ware.

The advantages of tunnel kilns are well recognized when a large quantity of bricks or the like are to be manufactured, the ware being heated, burned and cooled in successive zones which are maintained at substantially uniform temperatures, the ware being passed through the same upon suitable conveyor means such as successive cars. Such a kiln is controllable to permit uniform treatment of the ceramic material and to avoid the necessity for careful individual attention to the ware passing through various stages.

The present invention is particularly advantageous in permitting the surface treatment under heat, or flashing, of ware as it leaves the combustion zone, of a tunnel kiln, thus making the flashing treatment a part of the cycle through which the bricks pass in the burning kiln. In accordance with this invention, a flashing zone may be provided in the kiln adjoining the burning zone, suitable sources of coating material being disposed at this portion of the tunnel, such for example as furnaces, or nozzles for oil, tar or the like. Subsequent to the flashing zone the ware may pass to an annealing zone where the ware which has received a coating or surface treatment is first rapidly cooled before it passes to a gradual cooling zone wherein the temperature of the ware is gradually lowered before it passes out into the air. This arrangement not only permits the more convenient and economical flashing of brick or other ceramic articles, but also it permits the especially effective application of the surface coating agent, since the same may be applied directly to the faces of the ceramic articles as they pass through the flashing zone, while all of the ware receives substantially uniform surface treatment.

Preferably the tunnel is so arranged that the hot gases of the flashing zone are prevented from passing out of that zone into the cooling zone, and preferably a certain portion of the bases emitted from the flashing zone may be returned to the same thereby affording greater thermal economy and effectiveness in flashing.

Referring to the accompanying drawings:

Fig. 1 is a broken semi-diagrammatic sectional view of a tunnel kiln embodying the principles of this invention;

Fig. 2 is a corresponding vertical section through the kiln;

Figure 4:
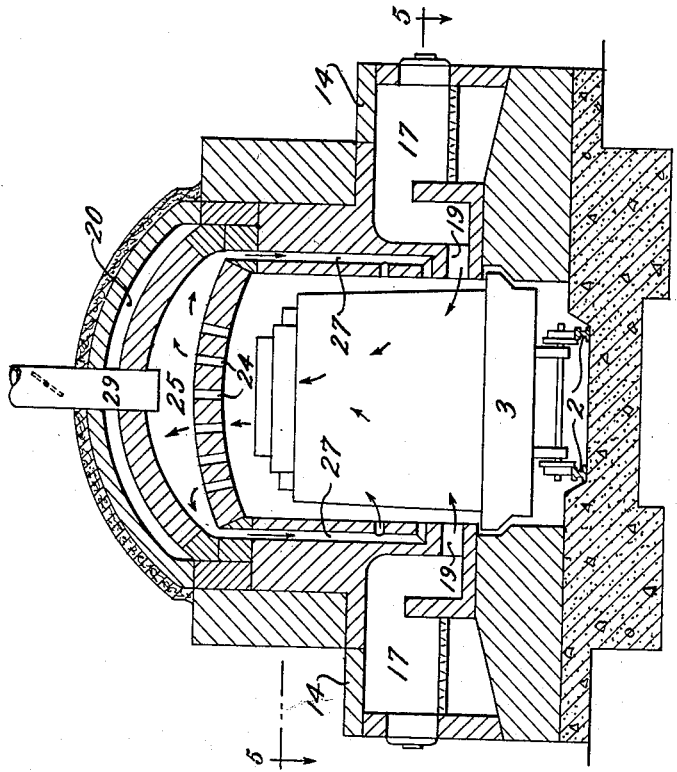
Fig. 4 is a view similar to Fig. 3, but illustrating an optional embodiment of the invention.

Referring to the accompanying drawings, the numeral 1 designates a tunnel kiln which may be provided with the usual track 2 upon which the cars 3 are disposed, the brick or other ceramic articles being supported upon the cars so that their surfaces are exposed for the flashing or coloring treatment. The kiln is provided with a preheating zone adjoining its entrance end, which is designated by the numeral 6. Hot air may be directed to this portion of the tunnel from a suitable source of supply. The air supplied to the preheating zone by duct 8 may, in part at least, be received from the hollow crowns 9 and 19 which are disposed over the combustion and cooling zones respectively of the tunnel, and are connected by a by-pass 20 over the flashing zone. Chambers 118 may be disposed at each side of the preheating zone and may receive hot air from duct 8; openings between these chambers and the interior of the tunnel permit the circulation of flow of hot air into the preheating zone and openings 60 between these chambers and the atmosphere permit the vapors or gases from the drying ware to be exhausted. From the preheating zone, the ware passes to the firing or combustion zone which is provided with a suitable number of heating factors, such as furnaces 12, which may be disposed at opposite sides of the tunnel in staggered relation to each other. The ware reaches its maximum temperature at this point and passes from the combustion zone to the flashing zone which may be provided with suitable means for imparting surface treatment at high temperature.

Thus, as shown in Fig. 4, furnaces 14 may be disposed at each side of the tunnel having fire boxes 17 to receive the various flashing mediums, such as coal, zinc oxide, salt and the like. The fire boxes are provided with outlet passages 19 adjoining the lower part of the side walls of the tunnel, i. e., adjoining the bottom of the ware carried by the cars 3. A plurality of outlets 24 are provided in the ceiling of the tunnel to permit gases from the fire boxes to pass upwardly into a hollow crown 25 for exhaustion or for recirculation.

A plurality of passages 27 connect the crown 25 with the sides of the flashing zone so that the flashing gases may be recirculated, while a damper controlled outlet 29 permits the exhaustion of a part of the gases to any suitable point of use. It is thus evident that circulation of the flashing gases or material is induced so that the same impinges upon the surface of substantially all of the ceramic ware and so that the latter may be substantially uniformly treated. The flashing zone may be of comparatively short extent and may only have two furnaces, nozzles or the like, one of the same upon each side.

Directly adjoining the flashing zone is a tempering or annealing zone having a plurality of inlet passages 33, preferably damper-controlled adjoining the lower part of the tunnel, whereby a limited quantity of cool air may pass over the ware, thus abruptly reducing its temperature to a point which is distinctly lower than that of the combustion and flashing zones, but which is materially above the temperature of the hot ware as it leaves the tunnel. In other words, this rapid cooling of the ware is sufficient to cause the setting of the flashing material or surface coating upon the ware, but does not lower the temperature of the latter sufficiently to result in danger of cracking or the like.

Adjoining the annealing zone is the cooling zone which may be conventional and which is effective in permitting the gradual reduction in temperature of the brick from that which it possesses leaving the annealing zone to a temperature which is not substantially higher than atmospheric temperature.

Figure 3:
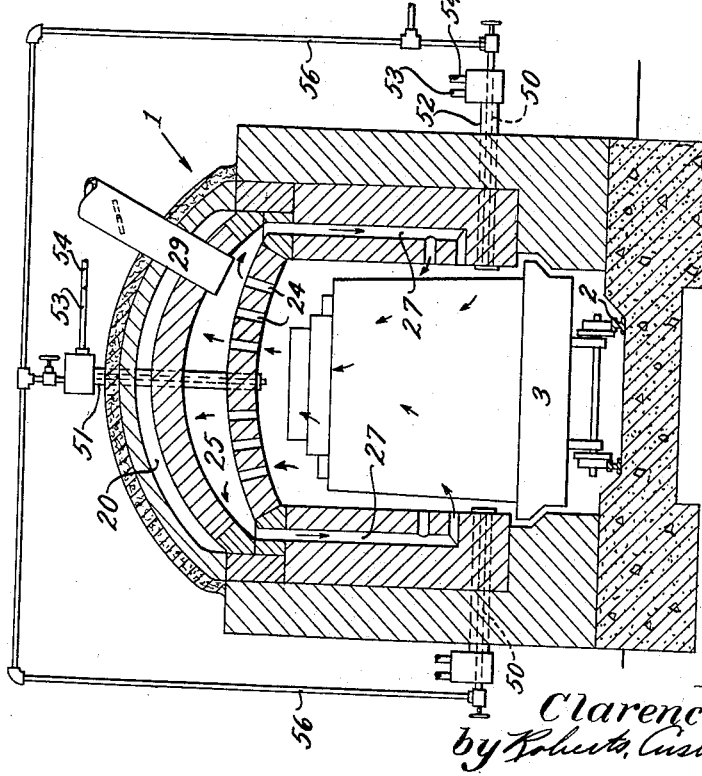
Fig. 3 is a transverse section of the flashing zone.
Figure 5:
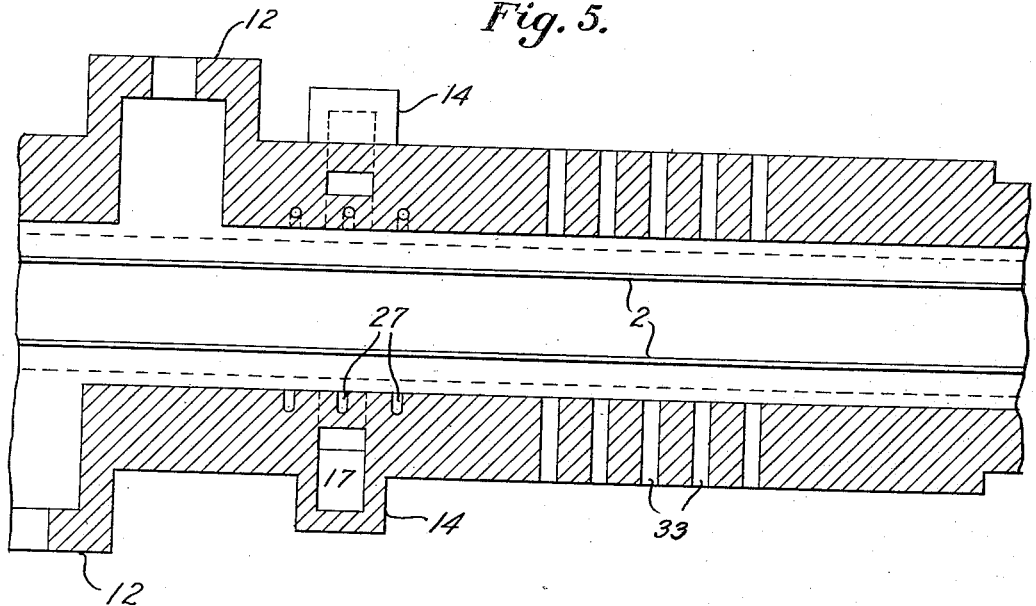
Fig. 5 is a section indicated by line 5—5 of Fig. 4.
Figure 6:
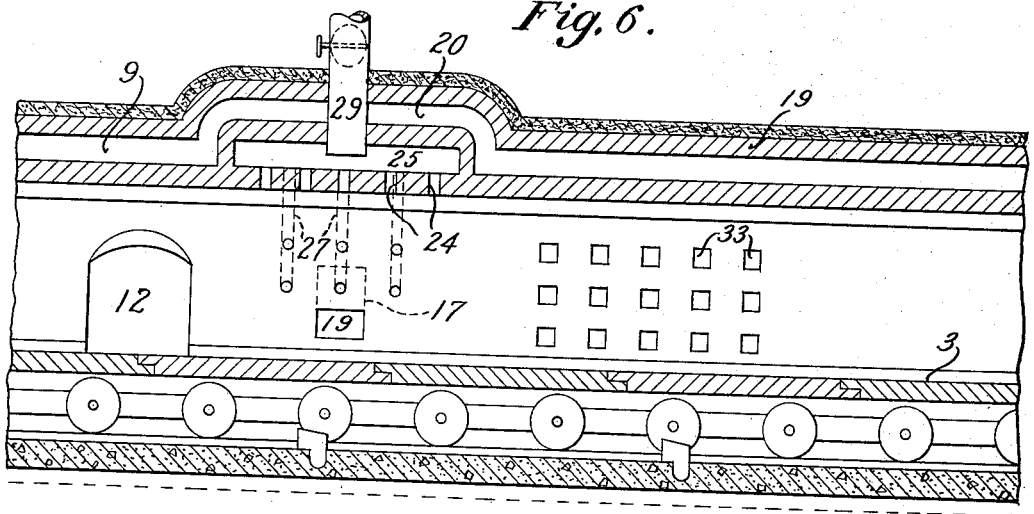
Fig. 6 is a vertical section of the flashing and annealing zones.

When certain types of materials are to be employed for flashing such as oil or tar liquid nozzles may be employed rather than the fire boxes 17. Such an optional arrangement is shown in Fig. 3 wherein nozzles 50 extend into the flashing zone at each side of the tunnel and a third nozzle 51 may extend into the upper part of the same. Each of these nozzles may be provided with a water-cooling jacket 52 which is connected to inlet and outlet ducts 53 and 54 respectively. The fluid such as oil or tar is supplied through suitable valve controlled ducts 56 under pressure and is ignited at the outlet of the nozzle; thus the burning fluid is directly impinged upon the exposed surfaces of the ware and an extremely effective flashing treatment is provided.

In the operation of apparatus of this character, combustion is maintained in the furnaces 12 and the fire boxes 17. The ware entering the tunnel passes into the preheating zone 6. The hollow crown 19 over the cooling zone receives air from any suitable source, for example, being supplied by the fan 40. A portion of this air is fed into the cooling zone through the damper controlled duct 41, thus cooling the ware and opposing movement of hot gases into the cooling zone, while the remainder thereof passes through the crown 19 and the by-pass 20 over the flashing zone to the crown 9; thus the air which is heated in the crown 19 passes to the region of the combustion zone, passing from the crown 9 through the duct 8 to the preheating zone, where a portion of the warm air is directly supplied to the upper part of the tunnel and the remainder thereof may pass into chamber 118 at each side of the preheating zone. Suitable openings permit the air to flow from the chambers 118 into this part of the tunnel and also permit circulation of moisture-laden air through the chambers 118 to the outlet passages 60. Accordingly the brick or other ware is heated as it passes through the preheating zone to the combustion zone where the furnaces 12 are effective in burning the brick. The latter reaches substantially its maximum temperature as it enters the flashing zone where the fire boxes 17 are effective in flashing the brick. The openings 24 in the upper part of the flashing zone permit these gases to be exhausted, a portion of the same being recirculated through passages 27 in the side walls of the zone and thus being returned to the interior of the tunnel. The outlet duct 29 is provided with a damper which permits the exhaustion of a controllable portion of the gases from the flashing zone to any suitable point of use. From the flashing zone the ware passes to the annealing zone where cool air entering through the small inlets 33, which may be damper controlled, is effective in sharply reducing the temperature of the ware so that it passes into the cooling zone with a temperature several hundred degrees lower than that which it had when leaving the combustion zone, although this temperature is sufficiently high to prevent cracking. In the cooling zone the gradual reduction in the temperature of the ware occurs in the usual manner, the heat thus dissipated being effective in heating the air in crown 19. As shown, suitable air passages may be provided for cooling the running gears of the cars.

I claim:

1. A tunnel kiln comprising a preheating zone, a combustion zone, heating factors associated with the combustion zone, a flashing zone adjoining the combustion zone provided with means for supplying coating material to the hot ware, a tempering zone adjoining the flashing zone and means for admitting a large volume of cool air directly to the tempering zone rapidly to reduce the temperature of the ware therein to a point sufficient to set the finish imparted to the ware by the flashing treatment, and a cooling zone adjoining the tempering zone with cooling means associated therewith to effect the gradual reduction of the temperature of the ware.

2. The method of treating ceramic ware which comprises moving the ware through successive zones which are maintained at substantially uniform temperatures, first moving the ware through the preheating zone wherein its temperature is gradually raised, then passing the ware through a firing zone where it is subjected to a burning temperature, thereupon passing the ware through a flashing zone wherein it is subjected to surface treatment at high temperature, then pasing the ware through an annealing zone wherein the initial cooling of the brick to a predetermined temperature condition is rapidly effected to set the finish imparted by the flashing treatment, and thereafter passing the ware into a zone wherein its temperature is gradually lower.

3. In a tunnel kiln having a preheating zone, a firing zone and a cooling zone, a flashing zone and a tempering zone disposed between the firing zone and the cooling zone, said tempering zone having means for rapidly reducing the temperature of the ware emerging from the flashing zone to a point sufficient to set the finish imparted thereto by the flashing treatment.

4. In a tunnel kiln having a preheating zone, a firing zone and a cooling zone, a flashing zone and a tempering zone disposed between the combustion zone and the cooling zone, said flashing zone being provided with inlets to supply surface coating material at high temperature, and outlets arranged to cooperate with the inlets in causing the circulation of the coating material in contact with the surface of the ware, and means to supply a relatively large quantity of cool air to the tempering zone to effect a rapid cooling of the ware emerging from the flashing zone, thereby to set the finish imparted to said ware by the flashing treatment.

5. In a tunnel kiln having a preheating zone, a firing zone and a cooling zone, a flashing zone and a tempering zone disposed between the combustion zone and the cooling zone, said flashing zone being provided with inlets to supply surface coating material at high temperature, and outlets arranged to cooperate with the inlets in causing the circulation of the coating material in contact with the surface of the ware, means receiving gases from the outlets of the flashing zone and supplying a portion of the gases for recirculation through said zone, and an exhaust duct for a portion of the remainder of said gases.

6. In a tunnel kiln, a flashing zone adjoining the combustion zone, means for supplying surface coating at high temperature to the flashing zone including inlet passages at either side of the lower portion of the tunnel and a plurality of outlet passages in the ceiling of the tunnel, and a hollow dome communicating with said outlet passages and a hollow dome communicating with said outlet passages and receiving the gases of the flashing zone therefrom.

7. A tunnel kiln comprising a preheating zone, a combustion zone, a flashing zone, a tempering zone, and a cooling zone, means for supplying hot surface coating material to the ware in the flashing zone, and means for admitting a large volume of cool air directly into said tempering zone to effect the rapid cooling of the ware therein to a point sufficient to set the finish imparted thereto by the flashing treatment, and means arranged substantially to prevent longitinal movement of the gases from the flashing zone to the tempering zone.

8. In a tunnel kiln comprising a preheating zone, a combustion zone, and a cooling zone, a flashing zone and an annealing zone between the combustion zone and the cooling zone, a hollow crown over the flashing zone, means supplying surface coating material to the flashing zone, an outlet to supply gases from said zone to the hollow crown, and return passages between the crown and the flashing zone to permit recirculation of said gases.

9. In a tunnel kiln comprising a preheating zone, a combustion zone, and a cooling zone, a flashing zone and an annealing zone between the combustion zone and the cooling zone, a hollow crown over the flashing zone, inlets for supplying hot surface coating material at opposite sides of the flashing zone, outlets to emit gases from the flashing zone to the crown, and passages in the side walls of the tunnel to supply gases from said crown to the sides of the flashing zone for recirculation.

10. In a tunnel kiln comprising a preheating zone, a combustion zone, and a cooling zone, a flashing zone and an annealing zone between the combustion zone and the cooling zone, a hollow crown over the flashing zone, means supplying surface coating material to the flashing zone, an outlet to supply gases from said zone to the hollow crown, return passages between the crown and the flashing zone to permit recirculation of gases, and an exhaust duct connected to said crown and arranged to receive a portion of the gases supplied to the same, whereby a part of the gases is recirculated through the flashing zone and a part is exhausted.

11. In a tunnel kiln comprising a preheating zone, a combustion zone, and a cooling zone, a flashing zone and an annealing zone between the combustion zone and the cooling zone, a hollow crown over the flashing zone, a chamber over the combustion zone, a chamber over the cooling zone, and a duct for supplying air from said chambers to the region of the preheating zone, means supplying surface coating material to the flashing zone, an outlet to supply gases from said zone to the hollow crown, and return passages between the crown and the flashing zone to permit recirculation of said gases.

12. A tunnel kiln comprising a preheating zone, a combustion zone, a flashing zone having means for supplying hot surface coating material to the ware therein, and a tempering zone having means to effect a rapid cooling of the ware emerging from the flashing zone, and means to prevent the movement of gases from the flashing zone to the tempering zone.

13. In a tunnel kiln having a flashing zone for imparting a surface finish to ceramic ware and a cooling zone, a tempering zone intermediate the flashing zone and the cooling zone, said tempering zone having means for rapidly cooling the ware emerging from the flashing zone to a point sufficient to prevent oxidation of the finish imparted thereto in the flashing zone.

14. Method of continuous manufacture of ceramic ware which comprises the successive steps of, first, subjecting the ware to a preheating treatment whereby its temperature is gradually increased, second, subjecting the ware to a burning treatment in an oxidizing atmosphere, third, subjecting the ware to a flashing treatment in a reducing atmosphere to impart a surface-finish thereto, fourth, immediately subjecting the ware to a tempering treatment rapidly to reduce its temperature to set the finish imparted thereto by the flashing treatment, and finally, gradually reducing the temperature of the ware.

Signed by me at Boston, Massachusetts, this 22nd day of May, 1930.

CLARENCE L. COLBERT.